(12) United States Patent
Ludewig et al.

(10) Patent No.: US 8,431,674 B2
(45) Date of Patent: Apr. 30, 2013

(54) POLYESTER PREPOLYMERS

(75) Inventors: Michael Ludewig, Leverkusen (DE); Mathias Matner, Neuss (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/023,924

(22) Filed: Feb. 9, 2011

(65) Prior Publication Data

US 2011/0130512 A1 Jun. 2, 2011

Related U.S. Application Data

(63) Continuation of application No. 12/121,854, filed on May 16, 2008, now abandoned.

(30) Foreign Application Priority Data

May 22, 2007 (DE) .......................... 10 2007 023 197

(51) Int. Cl.
*C08G 18/32* (2006.01)
(52) U.S. Cl.
USPC .......................................................... 528/83
(58) Field of Classification Search .................... 528/83
See application file for complete search history.

(56) References Cited

U.S. PATENT DOCUMENTS

| | | | |
|---|---|---|---|
| 3,627,722 A | 12/1971 | Seiter | |
| 3,632,557 A | 1/1972 | Brode et al. | |
| 5,364,955 A | 11/1994 | Zwiener et al. | |
| 5,756,751 A | 5/1998 | Schmalstieg et al. | |
| 6,048,579 A | 4/2000 | Wang et al. | |
| 6,756,456 B2 | 6/2004 | Sauterey et al. | |
| 2005/0131135 A1 | 6/2005 | Roesler et al. | |
| 2006/0142532 A1 | 6/2006 | Wintermantel et al. | |

FOREIGN PATENT DOCUMENTS

| | | |
|---|---|---|
| EP | 0070475 A2 | 1/1983 |
| EP | 0354472 A1 | 2/1990 |
| EP | 0372561 A2 | 6/1990 |
| EP | 0480363 A2 | 4/1992 |
| EP | 0596360 A1 | 5/1994 |
| EP | 0807649 A1 | 11/1997 |
| EP | 1674546 A1 | 6/2006 |
| WO | WO-00/00530 A1 | 1/2000 |
| WO | WO-2004/005420 A1 | 1/2004 |

*Primary Examiner* — Kuo-Liang Peng
(74) *Attorney, Agent, or Firm* — Novak Druce Connolly Bove + Quigg LLP

(57) ABSTRACT

The invention relates to prepolymers containing alkoxysilane groups based on special, low-viscosity polyester polyols, which exhibit particularly high tensile strength, a process for the production thereof and their use as a binder for adhesives, primers or coatings.

2 Claims, No Drawings

POLYESTER PREPOLYMERS

RELATED APPLICATION

This application is a continuation of U.S. patent application Ser. No. 12/121,854, filed May 16, 2008, now abandoned, which claims benefit to German Patent Application No. 102007023197.2. filed May 22, 2007, the disclosure of which is incorporated by reference herein in its entirety.

FIELD OF THE INVENTION

The present invention relates to prepolymers containing alkoxysilane groups based on special, low-viscosity polyester polyols, which exhibit particularly high strength, a process for the production thereof and their application as a binder for adhesives, primers or coatings.

BACKGROUND AND PRIOR ART

Alkoxysilane-functional polyurethanes which cure via silane polycondensation have long been known. A review article on this topic can be found e.g. in "Adhesives Age" April 1995, pages 30 ff (authors: Ta-Min Feng, B. A. Waldmann). Single-component polyurethanes of this type, which contain terminal alkoxysilane groups and which cure under the effect of moisture, are increasingly being used as flexible coating, sealing and adhesive compositions in the building trade and in the automotive industry.

These alkoxysilane-functional polyurethanes can be produced in accordance with U.S. Pat. Nos. 3,627,722 or 3,632, 557 by reacting, for example, polyether polyols with an excess of polyisocyanate to form an NCO-containing prepolymer, which is then further reacted with an amino-functional alkoxysilane. Another way of producing alkoxysilane-functional polyurethanes consists, according to the teaching of EP-A 0 070 475, in capping hydroxy-functional polyurethane prepolymers with isocyanate-functional alkoxysilanes. According to EP-A 0 372 561, long-chain polyethers which have not been pre-extended via prepolymerisation can also be used here. However, all these systems based on polyether polyols form flexible polymers with relatively low strength after curing, which are less suitable e.g. for structural bonding.

Polyester-based alkoxysilane-functional polyurethanes have also been described already. For example, EP-A 0 354 472 or WO2004/005420 describe silane-curing hot-melt adhesives which, although they can achieve considerable tensile strength, are by nature solids at ambient temperature. While it is true that EP-A 0 480 363 also describes a special polyester-based system in which acrylate components are also modified, however, a solvent is obviously needed in this case in order to be able to achieve the desired viscosity. A modern adhesive system should not contain any solvent, however.

The polyester polyol-based, silane-curing polyurethane described in U.S. Pat. No. 6,756,456 is referred to as being at least "flowable". In this case, however, the isocyanate used is TMXDI, which is accessible only with difficulty and is therefore expensive. In addition, the possibly low viscosity is obviously achieved by a polyether-polyester block structure. The patent specification provides no information on the tensile strength of such a system. As already explained, however, silane-curing polyurethanes containing polyether are rather flexible and exhibit a lower tensile strength.

SUMMARY OF THE INVENTION

The object of the present invention was now to provide polyester-based, silane-curing polyurethanes which exhibit a sufficiently low viscosity, can be processed at ambient temperature and, when cured, achieve high cohesive strength with, at the same time, sufficiently high extensibility, which permits structural bonding.

It has now been found that prepolymers of this type can be produced either by reacting a polyester polyol produced on the basis of the raw materials adipic acid, hexanediol and neopentyl glycol directly with an isocyanate-functional silane or by first producing an NCO prepolymer with a diisocyanate, which is then modified with an amino-functional silane in a second step.

The present invention therefore provides alkoxysilane group-modified polyurethanes of the general formula (I),

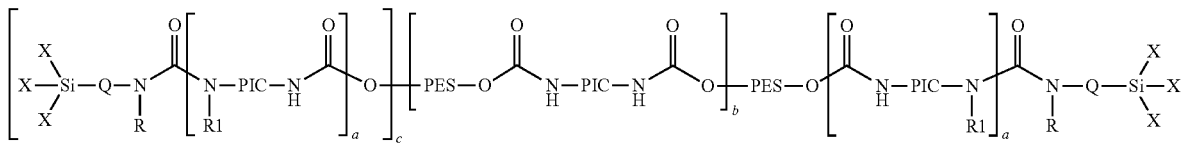

in which
PIC is a residue of a diisocyanate reduced by the isocyanate groups,
PES is a residue of a polyester polyol with 2-3 OH groups, reduced by the OH groups, at least 90 wt. % of which (based on acid and alcohols) was produced from adipic acid and a mixture of at least 20 wt. % each (based on the mixture) of butanediol or hexanediol and neopentyl glycol, having a number-average molecular weight (Mn) of between 500 g/mol and 2500 g/mol,
a=0 or 1,
b=0 to 5,
c=1 or 2,
X represents the same or different alkoxy or alkyl residues, which may also be bridged, but at least one alkoxy residue must be present on each Si atom here,
Q is a difunctional, linear or branched, aliphatic residue,
R denotes either hydrogen or any organic residue which can be bridged with R1 (if present), R always denoting hydrogen when a=0, and
R1 denotes either hydrogen or an organic residue which is bridged with R.

The invention also provides a process for the production of polyurethanes modified with alkoxysilane groups, in which either
A) a polyester polyol with 2-3 OH groups, at least 90 wt. % of which (based on acid and alcohols) was produced from adipic acid and a mixture of at least 20 wt. % each (based on the mixture) of butanediol or hexanediol and neopentyl glycol, having a number-average molecular weight (Mn) of between 500 g/mol and 2500 g/mol, is first reacted with an excess of diisocyanate to form an isocyanate-functional polyurethane prepolymer, which is then capped with an aminosilane, or B) a polyester polyol with 2-3 OH groups, at least 90 wt. % of which (based on acid and alcohols) was produced from adipic acid and a mixture of at least 20 wt. % each (based on the mixture) of butanediol or hexanediol and neopentyl glycol, having a number-average molecular weight (Mn) of between 500 g/mol and 2500 g/mol, is optionally first reacted with a deficiency of diisocyanate to form an OH-functional polyurethane prepolymer and then the OH groups of this prepolymer and/or polyester are capped with an isocyanate-functional alkoxysilane.

DESCRIPTION OF PREFERRED EMBODIMENTS

Essential to the invention is the use of a polyester polyol which is substantially the reaction product of adipic acid as the acid component with a diol component which is a mixture of neopentyl glycol and hexanediol and/or butanediol. This diol component must contain at least 20 wt. %, preferably at least 30 wt. %, neopentyl glycol and at least 20 wt. %, preferably at least 30 wt. %, hexanediol and/or butanediol.

The polyester polyol can also contain up to 10 wt. %, preferably up to 5 wt. %, of other components, such as triols, to modify the functionality. In principle, however, all polyhydric, preferably dihydric or trihydric alcohols can be incorporated, such as e.g. ethylene glycol, triethylene glycol, tetraethylene glycol, 1,2- and 1,3-propanediol, 1,4- and 1,3-butanediol, 1,6-hexanediol, 1,8-octanediol, neopentyl glycol, 1,4-bis(hydroxymethyl)cyclohexane, bis(hydroxymethyl) tricyclo[5.2.1.0$^{2.6}$]decane or 1,4-bis(2-hydroxyethoxy)benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, 1,4-phenoldimethanol, bisphenol A, tetrabromobisphenol A, glycerol, trimethylolpropane, 1,2,6-hexanetriol-1,2,4-butanetriol, pentaerythritol, quinitol, mannitol, sorbitol, methyl glycoside and 4,3,6-dianhydrohexite. Other polybasic, but preferably dibasic, carboxylic acids may optionally also be incorporated. Instead of the free polycarboxylic acids, the corresponding polycarboxylic anhydrides or corresponding polycarboxylic acid esters of lower alcohols or mixtures thereof can also be used for the production of the polyester The polycarboxylic acids can be aliphatic, cycloaliphatic, aromatic and/or heterocyclic in nature and optionally substituted, e.g. by halogen atoms, and/or unsaturated. The following are mentioned by way of examples: phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylene tetrahydrophthalic anhydride, maleic anhydride, maleic acid, fumaric acid, dimer and trimer fatty acids such as oleic acid, optionally mixed with monomer fatty acids, terephthalic acid dimethyl ester or terephthalic acid bisglycol ester. However, it is preferred for no other components to be incorporated.

The polyester polyols to be used according to the invention have number-average molecular weights of 500 g/mol to 2500 g/mol, preferably 800 g/mol to 2000 g/mol.

To produce the polyurethanes according to the invention, it is necessary in principle to modify the polyester polyol with components carrying alkoxysilane groups. Two processes that are known per se can be employed for this purpose.

Thus, it is possible on the one hand to modify the polyester polyol, or an OH-functional prepolymer produced by reacting the polyester polyol with a deficiency of diisocyanates, with an alkoxysilyl group which also carries an isocyanate group as additional functionality.

Compounds of this type are known per se, and isocyanatomethyltrimethoxysilane, isocyanatomethyltriethoxysilane, (isocyanatomethyl)methyldimethoxysilane, (isocyanatomethyl)methyldiethoxysilane, 3-isocyanatopropyltrimethoxysilane, 3-isocyanatopropylmethyldimethoxysilane, 3-isocyanatopropyltriethoxysilane and 3-isocyanatopropylmethyldiethoxysilane can be mentioned as examples. The use of 3-isocyanatopropyltrimethoxysilane is preferred here.

As already mentioned, in this embodiment of the process for the production of the polyurethane according to the invention it is also possible to use an OH-functional prepolymer, which was reacted by the reaction of the polyester polyol described with a deficiency of diisocyanate. An NCO:OH ratio of preferably 1:1.3 to 1:10, particularly preferably 1:1.5 to 1:3, is selected here. Aromatic, aliphatic and cycloaliphatic diisocyanates are suitable for use as diisocyanates. Suitable diisocyanates are compounds of the formula PIC(NCO)$_2$ with an average molecular weight of less than 400, wherein PIC signifies an aromatic $C_6$-$C_{15}$ hydrocarbon residue, an aliphatic $C_4$-$C_{12}$ hydrocarbon residue or a cycloaliphatic $C_6$-$C_{15}$ hydrocarbon residue, e.g. diisocyanates from the series 2,4-/2,6-toluene diisocyanate (TDI), methylene diphenyl diisocyanate (MDI), naphthyl diisocyanate (NDI), xylylene diisocyanate (XDI), 4,4'-diisocyanato-dicyclohexylmethane, 3-isocyanatomethyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethyl-hexamethylene diisocyanate (THDI), dodecamethylene diisocyanate, 1,4-diisocyanato-cyclohexane, 4,4'-diisocyanato-3,3'-dimethyldicyclohexylmethane, 4,4'-diisocyanato-dicyclohexylpropane-(2,2), 3-isocyanatomethyl-1-methyl-1-isocyanatocyclohexane (MCI), 1,3-diisooctylcyanato-4-methylcyclohexane, 1,3-diisocyanato-2-methyl-cyclohexane and α,α,α',α'-tetramethyl-m- or -p-xylylene diisocyanate (TMXDI) as well as mixtures consisting of these compounds. IPDI, HDI or TDI and/or MDI derivatives are preferably used here. 1-Isocyanato-3,3,5-trimethyl-5-isocyanatomethylcyclohexane (IPDI) or hexamethylene diisocyanate (HDI) are particularly preferably employed as the diisocyanate.

Both the optionally necessary production of an OH-functional prepolymer and the capping of this prepolymer or of the polyester polyol can be accelerated by suitable catalysis. To accelerate the NCO-OH reaction, urethanisation catalysts which are known per se to the person skilled in the art, such as organotin compounds or amine catalysts, are suitable. The following may be mentioned as examples of organotin compounds: dibutyltin diacetate, dibutyltin dilaurate, dibutyltin bisacetoacetonate and tin carboxylates, such as e.g. tin octoate. These tin catalysts can optionally be used in combination with amine catalysts, such as aminosilanes or 1,4-diazabicyclo[2.2.2]octane.

Particularly preferably, dibutyltin dilaurate is used as the urethanisation catalyst.

This catalyst component, where incorporated, is employed in the process according to the invention in quantities of 0.001 to 5.0 wt. %, preferably 0.001 to 0.1 wt. % and particularly preferably 0.005 to 0.05 wt. %, based on the solids content of the process product.

The urethanisation of the polyester polyols according to the invention with diisocyanates or isocyanate-functional alkoxysilanes is carried out at temperatures of 20 to 200° C., preferably 40 to 120° C. and particularly preferably 60 to 100° C.

The reaction is continued until complete conversion of the NCO groups of the isocyanate-containing compound is achieved. The progress of the reaction can be monitored by means of suitable measuring instruments installed in the reaction vessel and/or by means of analyses on samples taken. Appropriate methods are known to the person skilled in the art. Examples include viscosity measurements, measurements of the NCO content, the refractive index and the OH content, gas chromatography (GC), nuclear magnetic resonance (NMR) spectroscopy, infrared (IR) spectroscopy and near-infrared (NIR) spectroscopy. The NCO content of the mixture is preferably determined by a titrimetric method.

It is unimportant whether the process according to the invention is carried out continuously, e.g. in a static mixer, extruder or kneader, or batchwise, e.g. in a stirred reactor.

The process according to the invention is preferably carried out in a stirred reactor.

The alkoxysilane group-modified polyurethanes obtainable according to this embodiment of the invention have a viscosity of less than 100 000 mPas, preferably one of less than 30 000 mPas and especially preferably of less than 10 000 mPas (all 23° C., shear rate=47.94/s).

The second process for the production of the polyurethanes according to the invention is based on a reaction of the polyester polyols first with an excess of diisocyanate to form an isocyanate-functional prepolymer, and on the further reaction of these isocyanate groups with a compound carrying alkoxysilyl groups, which also carries a functionality that is reactive with isocyanate groups as an additional functionality.

In contrast to the first process, however, an excess of diisocyanate is used for the synthesis of an NCO prepolymer, preferably with the selection of an NCO:OH ratio of 1.3:1.0 to 2:1, particularly preferably 1.5:1.0 to 2:1. The aromatic, aliphatic and cycloaliphatic diisocyanates already mentioned are suitable for use as diisocyanates.

Here too, 1-isocyanato-3,3,5-trimethyl-5-isocyanatomethylcyclohexane (IPM) or hexamethylene diisocyanate (HDI) is preferably used as the diisocyanate.

As with the first process, this urethanisation can also be accelerated by catalysis; the temperature ranges of the reaction are also analogous.

The reaction is continued until complete conversion of the OH groups of the polyester polyols is achieved. The progress of the reaction is usefully monitored by checking the NCO content and it is complete when the appropriate theoretical NCO content is reached. This can be followed by suitable measuring instruments installed in the reaction vessel and/or by means of analyses on samples taken. Appropriate methods are known to the person skilled in the art. Examples include viscosity measurements, measurements of the NCO content, the refractive index and the OH content, gas chromatography (GC), nuclear magnetic resonance (NMR) spectroscopy, infrared (IR) spectroscopy and near-infrared (NIR) spectroscopy. The NCO content of the mixture is preferably determined by a titrimetric method.

In a further step, these NCO prepolymers are reacted with isocyanate-reactive alkoxysilane compounds. Suitable isocyanate-reactive alkoxysilane compounds are adequately known to the person skilled in the art, the following being mentioned as examples: aminopropyltrimethoxysilane, mercaptopropyltrimethoxysilane, aminopropylmethyldimethoxysilane, mercaptopropylmethyldimethoxysilane, aminopropyltriethoxysilane, mercaptopropyltriethoxysilane, aminopropylmethyldiethoxysilane, mercaptopropylmethyldiethoxysilane, aminomethyltrimethoxysilane, aminomethyltriethoxysilane, (aminomethyl)methyldimethoxysilane, (aminomethyl)methyldiethoxysilane, N-butylaminopropyltrimethoxysilane, N-ethylaminopropyltrimethoxysilane and N-phenylaminopropyltrimethoxysilane.

In addition, the aspartic acid esters as described in EP-A 596360 can also be used as isocyanate-reactive compounds. In these molecules of general formula II

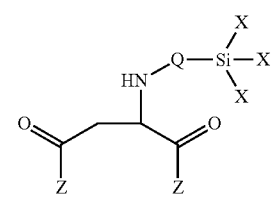

X signifies the same or different alkoxy or alkyl residues, which may also be bridged, but at least one alkoxy residue must be present on each Si atom here, Q is a difunctional, linear or branched aliphatic residue and Z denotes an alkoxy residue with 1 to 10 carbon atoms. The use of these aspartic acid esters is preferred for this embodiment of the invention. Examples of particularly preferred aspartic acid esters are N-(3-triethoxysilylpropyl)aspartic acid diethyl ester, N-(3-trimethoxysilylpropyl)aspartic acid diethyl ester and N-(3-dimethoxymethylsilylpropyl)aspartic acid diethyl ester. The use of N-(3-trimethoxysilylpropyl)aspartic acid diethyl ester is especially preferred.

This reaction with isocyanate-reactive alkoxysilanes takes place within a temperature range of 0° C. to 150° C., preferably 20° C. to 80° C., the quantitative ratios generally being selected such that 0.95 to 1.1 moles of the isocyanate-reactive alkoxysilane compound are used per mole of NCO groups used.

In the particularly preferred use of the isocyanate-reactive alkoxysilanes of formula II, according to the teaching of EP-A 0 807 649, a cyclocondensation can take place which can reduce the viscosity of the alkoxysilane group-containing prepolymers according to the invention still further. Accordingly, this hydantoin formation can also be brought about intentionally in a preferred embodiment of the present invention.

This cyclocondensation can be brought about by simply stirring the polyester-based polyurethane prepolymer capped with an isocyanate-reactive alkoxysilane of formula II at temperatures of 70° C. to 180° C., preferably of 80° C. to 150° C. The reaction can be carried out without further catalysis or, preferably, accelerated by catalysis. Both basic and acidic organic compounds are suitable as catalysts, for example N,N,N,N-benzyltrimethylammonium hydroxide, other hydroxides which are soluble in organic media, DBN, DBU, other amidines, tin octoate, dibutyltin dilaurate, other organic tin compounds, zinc octoate, acetic acid, other alkanoic acids, benzoic acid, benzoyl chloride, other acid chlorides or dibutyl phosphate, or other derivatives of phosphoric acid. The catalyst is added in quantities of 0.005 wt. % to 5 wt. %, preferably 0.05 wt. % to 1 wt. %.

The polyurethanes modified with alkoxysilane groups obtainable according to this embodiment of the invention have a viscosity of less than 500 000 mPas and preferably one of less than 100 000 mPas (all 23° C., shear rate=47.94/s).

The compounds according to the invention are highly suitable as binders for the production of isocyanate-free polyurethane adhesives. These adhesives cure under the action of atmospheric humidity by means of a silanol polycondensation.

An application in primers or coatings is also conceivable.

The present invention therefore also provides adhesives, primers and coatings based on the polyurethane prepolymers according to the invention.

To produce these adhesives, the polyurethane prepolymers containing alkoxysilane end groups according to the invention can be formulated together with conventional plasticisers, fillers, pigments, drying agents, additives, light stabilisers, antioxidants, thixotropic agents, catalysts, adhesion promoters and optionally other auxiliary substances and additives by known sealant manufacturing processes.

Suitable fillers that may be mentioned include, by way of example, carbon black, precipitated silicas, pyrogenic silicas, mineral chalks and precipitated chalks. Suitable plasticisers that may be mentioned include, by way of example, phthalates, adipates, alkylsulfonates of phenol or phosphoric acid esters.

Examples of thixotropic agents that may be mentioned include pyrogenic silicas, polyamides, reaction products of hydrogenated castor oil or else polyvinyl chloride.

As suitable catalysts for curing, it is possible to use all organometallic compounds and amine catalysts that are known to promote silane polycondensation. Particularly suitable organometallic compounds are, in particular, compounds of tin and of titanium. Preferred tin compounds are, for example: dibutyltin diacetate, dibutyltin dilaurate, dioctyltin maleate and tin carboxylates, such as e.g. tin(II) octoate or dibutyltin bisacetoacetonate. The tin catalysts mentioned may optionally be used in combination with amine catalysts, such as aminosilanes or 1,4-diazabicyclo[2.2.2]octane. Preferred titanium compounds are, for example, alkyl titanates, such as diisobutylbisethylacetoacetate titanate. Where amine catalysts are used alone, those which exhibit a particularly high basicity are particularly suitable, such as amines with an amidine structure. Preferred amine catalysts are therefore 1,8-diazabicyclo[5.4.0]undec-7-ene or 1,5-diazabicyclo[4.3.0]non-5-ene, for example.

In particular, alkoxysilyl compounds, such as vinyltrimethoxysilane, methyltrimethoxysilane, i-butyltrimethoxysilane and hexadecyltrimethoxysilane, may be mentioned as drying agents.

The known functional silanes, such as e.g. aminosilanes of the type mentioned above but also N-aminoethyl-3-aminopropyltrimethoxy and/or N-aminoethyl-3-aminopropylmethyldimethoxysilane, epoxysilanes and/or mercaptosilanes, are used as adhesion promoters.

EXAMPLES

All percentages refer to the percentage by weight, unless otherwise specified.

The determination of the NCO contents in % was performed by means of back titration with 0.1 mol/l hydrochloric acid after reaction with butylamine, based on DIN EN ISO 11909.

The viscosity measurements were performed at 23° C., with a shear rate of 47.94/s using a plate-plate rotational viscometer, RotoVisko 1 from Haake, DE, in accordance with ISO/DIS 3219:1990.

The ambient temperature prevailing at the time of conducting the tests, 23° C., is referred to as RT.

Polyester diol A: polyester consisting of 1,6-hexanediol (25.8%), neopentyl glycol (29.6%) and adipic acid (592%), minus water (14.6%), OH value: 94 mg KOH/g.

Polyester diol B: polyester consisting of 1,6-hexanediol (24.2%), neopentyl glycol (27.8%) and adipic acid (63.8%), minus water (15.8%), OH value: 31 mg KOH/g.

Example 1 (According to the Invention)

In a 5 l sulfonating beaker with a lid, stirrer, thermometer and nitrogen flow, 0.6 g dibutyltin dilaurate (Desmorapid Z®, Bayer MaterialScience AG, Leverkusen, DE) were added to 2197.92 g of the polyester diol A and the mixture was heated to 60° C. 814.3 g isocyanatopropyltrimethoxysilane (Geniosil® GF40, Wacker AG, Burghausen) were then added dropwise over three hours and stirring was continued until an NCO content could no longer be detected by titration. The alkoxysilyl end group-containing polyurethane prepolymer obtained had a viscosity of 6,450 mPas (23° C.).

Example 2 (According to the Invention)

In a 10 l reactor with a lid, stirrer, thermometer and nitrogen flow, 0.5 g dibutyltin dilaurate (Desmorapid Z®, Bayer MaterialScience AG, Leverkusen, DE) were added to 4470.2 g of the polyester diol B and the mixture was heated to 60° C. 529.3 g isocyanatopropyltrimethoxysilane (Geniosil® GF40, Wacker AG, Burghausen) were then added dropwise over half an hour and stirring was continued until an NCO content could no longer be detected by titration. The alkoxysilyl end group-containing polyurethane prepolymer obtained had a viscosity of 90,500 mPas (23° C.).

Example 3 (According to the Invention)

In a 5 l sulfonating beaker with a lid, stirrer, thermometer and nitrogen flow, 0.2 g dibutyltin dilaurate (Desmorapid® Z, Bayer MaterialScience AG, Leverkusen, DE) were added to 2387.2 g of the polyester diol A and the mixture was heated to 60° C. Next, 117.6 g hexamethylene diisocyanate (Desmodur H®, Bayer MaterialScience AG, Leverkusen, DE) were added first over half an hour and 557.1 g isocyanatopropyltrimethoxysilane (Geniosil® GF40, Wacker AG, Burghausen) were then added dropwise over an hour and stirring was continued until an NCO content could no longer be detected by titration. The alkoxysilyl end group-containing polyurethane prepolymer obtained had a viscosity of 25,100 mPas (23° C.).

Example 4 (According to the Invention)

566.2 g of the polyester diol A were prepolymerised with 205.3 g isophorone diisocyanate (Bayer MaterialScience AG, Leverkusen) at 60° C. with the addition of 200 ppm dibutyltin dilaurate (Desmorapid® Z, Bayer MaterialScience AG, Leverkusen, DE) until the theoretical NCO content of 4.62% was reached. Next, at 60° C., 118 g Mesamoll (Lanxess AG, Leverkusen, DE) were added first and then 299.2 g N-(3-trimethoxysilylpropyl)aspartic acid diethyl ester (produced in accordance with EP-A-0 596 360, example 5), and the mixture was stirred until no isocyanate band could be seen in the IR spectrum any longer. The alkoxysilane end group-containing polyurethane prepolymer obtained had a viscosity of 350,000 mPas (23° C.).

Example 5 (According to the Invention)

596.8 g of the polyester diol A were prepolymerised with 155.4 g hexamethylene diisocyanate (Desmodur H®, Bayer MaterialScience AG, Leverkusen, DE) at 60° C. with the addition of 50 ppm dibutyltin dilaurate (Desmorapid® Z, Bayer MaterialScience AG, Leverkusen, DE) until the theoretical NCO content of 4.75% was reached. Next, at 60° C., 299.2 g N-(3-trimethoxysilylpropyl)aspartic acid diethyl ester (produced in accordance with EP-A 0 596 360, example 5) were added, and the mixture was stirred until no isocyanate band could be seen in the IR spectrum any longer. At this point, the viscosity was 100 000 mPas (23° C.). 10.5 g of acetic acid were then mixed in and the temperature was increased to 100° C., at which point ethanol escapes. After six hours the viscosity was still 64,000 mPas (23° C.) and the product was decanted.

Comparative Example (Not According to the Invention)

918 g of a polypropylene glycol having an OH value of 6.1 (Acclaim® 18200N, Bayer MaterialScience AG, Leverkusen, DE) were dried for six hours in vacuo (low nitrogen flow) at 120° C. Then, at 60° C., first 24.57 g 3-isocyanatopropyltrimethoxysilane (A-link® 35, GE Advanced Materials, Wilton, Conn., USA) (characteristic value 1.10) and then 50 ppm dibutyltin dilaurate (Desmorapid® Z, Bayer MaterialScience AG, Leverkusen, DE) were rapidly added and the reaction was continued at 60° C. for five hours until a residual NCO value of 0.03% was reached. The reaction was cooled to 50° C. and 0.32 g of methanol were mixed in. Stirring was continued for about 90 minutes at 50° C. until no NCO content could be detected any longer. The alkoxysilyl end group-containing polyurethane prepolymer obtained had a viscosity of 48,000 mPas (23° C.).

Examples of Applications

To evaluate the application properties of the different polymers, these were processed in the following formulation:

|  | Quantity used in wt. % |
| --- | --- |
| Polymer | 40.95 |
| Filler (Socal ® U₁S₂) | 55.30 |
| Drying agent (Dynasylan ® VTMO) | 2.50 |
| Adhesion promoter (Dynasylan ® 1146) | 1.20 |
| Catalyst (Tegokat ® 233) | 0.05 |

To produce the formulation, filler (Socal® U1S2 from Solvay GmbH) and drying agent (Dynasylan® VTMO from Degussa) are added to the binder and mixed in a vacuum dissolver with a wall scraper at 3000 rpm. The adhesion promoter (Dynasylan® 1146 from Degussa) is then added and stirred in at 1000 rpm within 5 min. Lastly, the catalyst (Tegokat® 233 from Goldschmidt) is mixed in at 1000 rpm and the finished mixture is finally degassed in vacua.

To measure the physical properties, both membranes 2 mm thick and samples to determine the longitudinal shear strength are produced. From the membranes, S2 specimens are stamped, and to measure the longitudinal shear strength, specimens of oak are used. The membranes are stored for 14 days at 23° C./50% relative humidity to cure and the specimens for the tensile shear tests are stored for 28 days, also at 23° C./50% relative humidity.

The hardness of the films is measured in accordance with DIN 53505, the mechanical properties of the S2 bars on the basis of DIN 53504 and the longitudinal shear strength according to DIN 281.

The following table shows the results obtained:

|  | Cp. | Ex. 1 | Ex. 3 | Ex. 5 |
| --- | --- | --- | --- | --- |
| Shore A hardness | 72 | 88 | 85 | 90 |
| Tensile strength [MPa] | 3.1 | 5.8 | 7.5 | 6.4 |
| Elongation at break [%] | 181 | 9 | 21 | 10 |
| Longitudinal shear strength [MPa] | 2.8 | 3.9 | 4.3 | 4.4 |

Examples 1-5 show the clear gain in strength that can be achieved by using polyester-based, silane-curing polyurethanes. The tensile strengths of the pure adhesive film are 87 to 242% higher than that of the comparative example, which is based on a polyether. The measurements on adhesive joints (oak/oak) also show significant increases in strength, in this case ranging from 39 to 57%.

Thus it can clearly be shown that the use of polyester-based, silane-curing polyurethanes permits a large gain in cohesive strength. At the same time, by means of suitable synthetic processes, the viscosity of the polymers can be kept sufficiently low that they can be handled without any problems.

All documents mentioned herein are incorporated by reference to the extent relevant to making, using or describing the present invention.

The invention claimed is:

1. Alkoxysilane group-containing polyurethanes of the general formula (I),

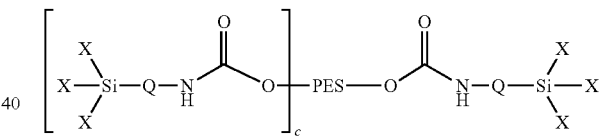

wherein
PES is a residue of a polyester polyol with 2-3 OH groups, reduced by the OH groups, at least 90 wt.% of which (based on acid and alcohols) was produced from adipic acid and a mixture of at least 20 wt.% each (based on the mixture) of butanediol or hexanediol and neopentyl glycol, having a number-average molecular weight (Mn) of between 500 g/mol and 2500 g/mol,
c =1 or 2,
X represents the same or different alkoxy or alkyl residues, which may also be bridged, provided that at least one alkoxy residue is present on each Si atom,
Q is a difunctional, linear or branched, aliphatic residue.

2. An adhesive, coating or primer which comprises at least one alkoxysilane group-containing polyurethane according to claim 1.

* * * * *